Sept. 30, 1958         A. DOBROWOLSKI         2,854,241
              CONVERTIBLE CHILD'S VEHICLE
Filed Nov. 24, 1954                    2 Sheets-Sheet 1
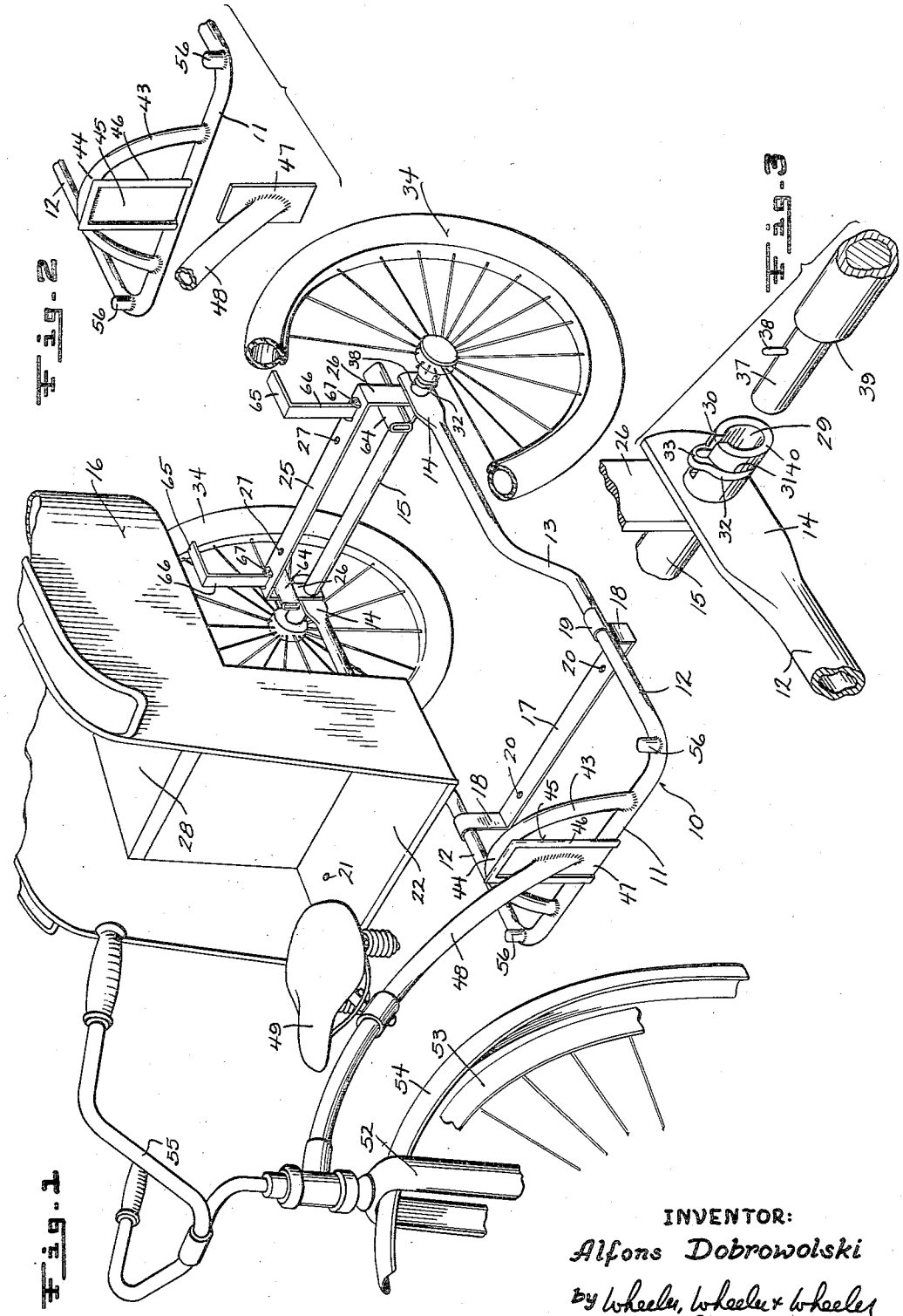
INVENTOR:
Alfons Dobrowolski
by Wheeler, Wheeler & Wheeler
Attorneys Sept. 30, 1958  A. DOBROWOLSKI  2,854,241
CONVERTIBLE CHILD'S VEHICLE
Filed Nov. 24, 1954  2 Sheets-Sheet 2
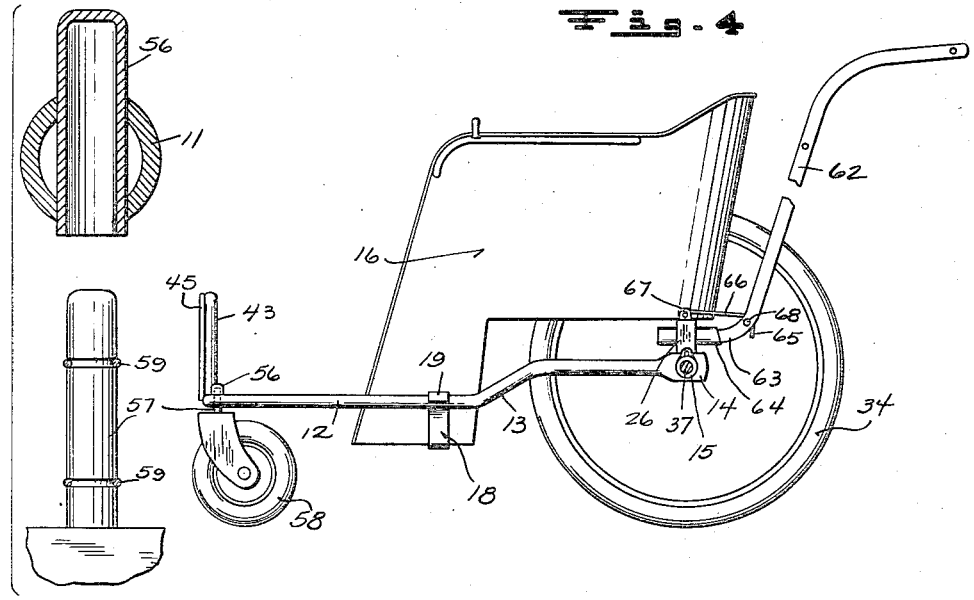
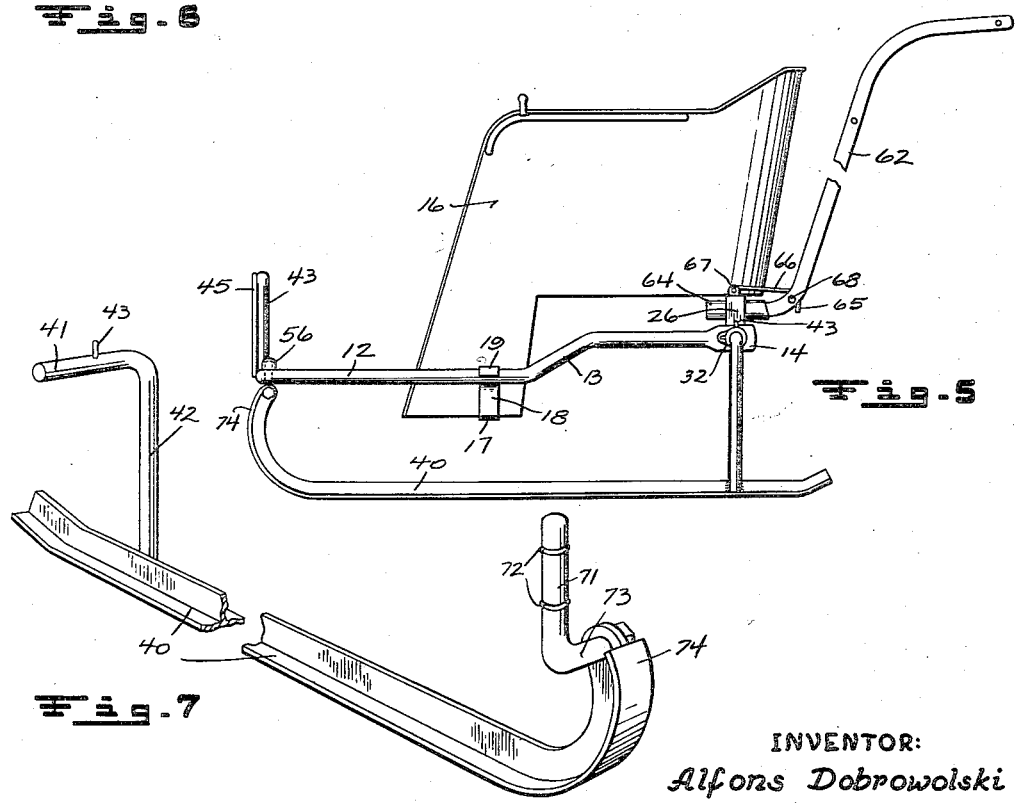
INVENTOR:
Alfons Dobrowolski
by Wheeler, Wheeler & Wheeler
Attorneys

United States Patent Office 2,854,241
Patented Sept. 30, 1958

2,854,241
CONVERTIBLE CHILD'S VEHICLE
Alfons Dobrowolski, Racine, Wis.

Application November 24, 1954, Serial No. 471,070

4 Claims. (Cl. 280—7.17)

This invention relates to improvements in a convertible child's vehicle.

The invention herein disclosed is an improvement on the devices shown in my prior Patents 2,158,618 and 2,143,548.

The invention relates to the novel structure of my device in which a single base frame may be variously adapted to multiple uses by interchangeable connection therewith of auxiliary elements specific to such uses. An important feature of my invention resides in the manner of connecting the auxiliary elements to the base frame. In particular the device of the present invention is provided with a novel releasable lock between the base frame rear axle and interchangeable elements for the support of the device, such as rear wheels or sled runners. I also provide a novel disconnect between the front end of the base frame and a tricycle bar. The front end of the base frame is also provided with a socket for releasable connection of a caster wheel shank, or alternately a similar shank of a sled runner. Accordingly, the base frame may be interchangeably used with a tricycle bar, with a caster wheel for use of the device as a stroller or a sled runner for use of the device as a sled. When used as a stroller or sled, the device may be provided with a push handle having releasable connection to the base frame.

Other objects and advantages of the invention will be more apparent from an examination of the following disclosures.

In the drawings:

Fig. 1 is a fragmentary perspective view of the device of my invention assembled for use as a tricycle, a passenger seat being shown in spaced relation to the base frame.

Fig. 2 is a fragmentary view in spaced apart relationship of my novel disconnect between the base frame of the device and the tricycle bar.

Fig. 3 is an enlarged fragmentary view showing my novel locking mechanism for interchangeably mounting various support elements on the rear axle of the base frame.

Fig. 4 is a side elevational view of the device converted for use as a stroller with wheels.

Fig. 5 is a view similar to Fig. 4 but showing the device converted for use as a stroller with sled runners.

Fig. 6 is a fragmentary view in spaced apart relation of the caster wheel stem and socket, the socket being shown in cross section and both parts being greatly enlarged.

Fig. 7 is a fragmentary perspective view of the sled runner shown in Fig. 5.

The convertible vehicle is basically assembled upon a base frame indicated generally by reference character 10 and which desirably comprises a tube bent in U-configuration to include a front cross member 11 and side members 12. Side members 12 are desirably bent obliquely at 13 and have their rear ends flattened at 14 and apertured to provide for connection to rear axle 15.

A bucket type seat 16 may be removably mounted on the base frame 10 on a cross strap 17 depending from bracket arms 18 provided with curved hook portions 19 which may be welded to the tubular side arms 12. As illustrated in Fig. 1, the strap 17 may be provided with suitable apertures 20 registering with like apertures 21 in the foot rest 22 of the bucket seat 16.

At its rear end the base frame may be provided with a cross strap 25 supported in elevated positions on bracket legs 26 welded to the flattened portions 14 of the frame arms 12. Cross member 25 may be provided with suitable apertures 27 registering with similar apertures (not shown) in the seat portion 28 of bucket seat 16. Accordingly, the bucket seat 16 is mounted at its front portion on a depending cross strap 17 and at its rear portion on an elevated strap 25. The difference in level between straps 17 and 25 is substantially equal to the difference in level between foot rest 22 and seat 28.

Rear axle 15 is desirably tubular, at least at its projecting ends which are axially bored as indicated by reference character 29 in Fig. 3. The wall of the tube is also provided with an axially extending slot 30 intersected by a peripheral groove 31 in which locking collar or ring 32 is rotatably seated. The locking collar 32 has a radially offset portion 33 which may be selectively aligned with the slot 30. Accordingly, a vehicle support, such as the wheel 34 provided with a stem 37 having a radially projecting peg 38, may be mounted on the axle by telescopically engaging stem 37 with bore 29 of the axle. In this manipulation peg 38 is passed through the slot 30 and the radially offset portion 33 of the collar 32. Stem 37 may be provided with a shoulder 39 which seats against the end 40 of the axle 15. With the wheel thus seated the rotatable locking collar 32 may be rotated to its position shown in Fig. 1 in which the peg 38 is locked behind the ring to preclude withdrawal of the stem from the axle.

When another vehicle support, such as the sled runner 40, is to be substituted for the wheel 34, collar 32 is rotated to align its radially offset portion 33 with the slot and permit withdrawal of the stem 37. Sled runner 40 is provided with a like stem 41 mounted on runner leg 42. The stem 41 is provided with a radial peg 43 which functions in the same manner as peg 38 of wheel stem 37. Accordingly, it is clear that vehicle support elements are readily interchanged with the axle.

The forward tubular cross member 11 on the base frame 10 is provided with an upwardly bowed tubular member 43. The intermediate portion 44 of tube 43 is thus spaced from the member 11. Spanning the space is a channel member comprising a rear plate 45 and lateral channel flanges 46 in which a rectangular plate 47 welded transversely on tricycle bar 48 may be slidably engaged.

The tricycle bar 48 is provided with an adjustably positioned seat 49, a front fork 52, front wheel 53, fender 54, and a steering handle bar 55. As shown in Fig. 1 the tricycle bar 48 may be interconnected to the base frame to constitute the device a tricycle with a passenger seat 16.

The base frame is also provided with paired sockets 56 at the front corners of the base frame to removably receive the stems 57 of caster wheels 58, as shown in Figs. 4 and 6. When it is desired to convert the device from a tricycle to a stroller, the plate 47 of tricycle bar 48 is disconnected by sliding it out of its channel way, and the caster wheels 58 are mounted on the frame with their stems engaging the sockets 56. The caster wheel stems are desirably provided with axially spaced expander rings 59 which frictionally engage the wall of the socket 56 to impositively lock the stems in place.

A removable push handle may also be provided for use with the vehicle as a stroller. As shown in Fig. 4 the handle comprises laterally spaced arms 62 having turned ends 63 removably engaged in the sleeves 64 which are mounted on the brackets 26. Cross strap 25 may be provided with hooks 65 having legs 66 pivotally connected to the cross member 25 on hinge pins 67. Accordingly, as shown in Fig. 4, when the ends 63 of the handle arms 62 are engaged in socket sleeves 64 the hook arms 66 may be pivoted downwardly about their pins 67 to engage the hook 65 with a cross rod 68 which connects the arms 62. Accordingly, the push handle is locked in place but may be easily removed when the vehicle is converted for use as a tricycle.

In the wintertime it may be desirable to substitute the sled runners 40 in place of the rear wheels 34 and caster wheels 58. As previously described the sled runners 40 have stems 41 which may be interlockingly received in the tubular bore of rear axle 15. The front ends of the sled runners are also provided with a stem 71 having expander rings 72 engageable in the socket 56 of the base frame member. Stem 71 is desirably pivotally connected on its pivot member 73 to the bow 74 of the sled runner. The pivotal adjustment facilitates interconnection of the stem 71 with the socket 56.

From the foregoing it is clear that my multiple purpose convertible vehicle can be manufactured and sold at less cost than the aggregate cost of single use vehicles adapted for the same uses as my vehicle. Prior attempts to provide convertible vehicles have sometimes failed because of the complex structure needed. In my device, however, a single base frame is common to each vehicle and the various parts are readily and easily interchanged for use therewith.

I claim:

1. A frame for a child's vehicle comprising a tubular member bowed in U-shaped configuration and including a front cross member and side members, a front cross strap spaced rearwardly from said front cross member and a rear cross strap spanning the rear ends of said side members, said side members having front and rear substantially horizontal portions connected with said front cross member and rear cross strap and vertically obliquely bent intermediate portions whereby said front cross strap is at a lower level than the rear cross strap, and a passenger support having a seat mounted on the rear cross strap and a foot rest mounted on the front cross strap, said seat and foot rest being at correspondingly different levels.

2. A frame for a child's vehicle comprising a tubular member bowed in U-shaped configuration and including a front cross member and side members, a front cross strap spaced rearwardly from said front cross member and a rear cross strap spanning the rear ends of said side members, said side members having vertically obliquely bent intermediate portions whereby said front cross strap is at a lower level than the rear cross strap, and a passenger support having a seat mounted on the rear cross strap and a foot rest mounted on the front cross strap, said seat and foot rest being at correspondingly different levels, said front cross strap being provided with side brackets from which said cross strap depends below the level of the side arms, said rear cross strap being provided with side brackets on which it is elevated above the level of said side arms.

3. The device of claim 1 in which said frame is provided with a rear axle having means for interchangeably mounting rear wheels and sled runners, the front cross member of said frame being provided with means to interchangeably mount a front tricycle wheel and a front caster wheel.

4. A combination stroller and tricycle comprising a base frame having rear wheels, a first forward coupling comprising an upright socket adapted to receive for rotation on a vertical axis the upright shaft of a caster wheel cooperative with said rear wheels for use of the device as a stroller, said frame having a second coupling part separate from said first coupling and adapted for interconnection with a complementary second coupling part on the bar of a tricycle front wheel to connect said front tricycle wheel to said frame for use of the device as a tricycle, said second coupling parts comprising an upright plate on the bar and an upright channel on the frame, said channel having side flanges slidably embracing the margins of the bar plate.

References Cited in the file of this patent

UNITED STATES PATENTS

| | | |
|---|---|---|
| 1,134,179 | Boyd | Apr. 6, 1915 |
| 1,174,333 | Mead et al. | Mar. 7, 1916 |
| 1,218,943 | Hudry | Mar. 13, 1917 |
| 1,475,257 | Bottone | Nov. 27, 1923 |
| 1,482,506 | Bradford | Feb. 5, 1924 |
| 1,484,876 | Dobrowolski | Feb. 26, 1924 |
| 1,506,565 | Clatworthy | Aug. 26, 1924 |
| 1,570,410 | Strauss | Jan. 19, 1926 |
| 1,790,195 | Baker | Jan. 27, 1931 |
| 2,062,108 | Rickerson | Nov. 24, 1936 |
| 2,103,106 | Yurkovitch | Dec. 21, 1937 |
| 2,143,548 | Dobrowolski | Jan. 10, 1939 |
| 2,158,618 | Dobrowolski | May 16, 1939 |
| 2,173,159 | Ewan | Sept. 19, 1939 |
| 2,296,415 | Baker et al. | Sept. 22, 1942 |
| 2,565,848 | Howard | Aug. 28, 1951 |

FOREIGN PATENTS

| | | |
|---|---|---|
| 608,184 | Great Britain | Sept. 10, 1948 |